US011103813B2

(12) United States Patent
Lopez

(10) Patent No.: US 11,103,813 B2
(45) Date of Patent: Aug. 31, 2021

(54) ADJUSTABLE BERNOULLI SKIMMER BASKET

(71) Applicant: Thomas V. Lopez, Phoenix, AZ (US)

(72) Inventor: Thomas V. Lopez, Phoenix, AZ (US)

( * ) Notice: Subject to any disclaimer, the term of this patent is extended or adjusted under 35 U.S.C. 154(b) by 0 days.

(21) Appl. No.: 16/785,602

(22) Filed: Feb. 9, 2020

(65) Prior Publication Data
US 2020/0197838 A1 Jun. 25, 2020

Related U.S. Application Data

(63) Continuation-in-part of application No. 14/082,110, filed on Nov. 16, 2013, now Pat. No. 9,260,877.

(51) Int. Cl.
*B01D 29/31* (2006.01)
*B01D 29/94* (2006.01)
*E04H 4/12* (2006.01)
*E04H 4/14* (2006.01)

(52) U.S. Cl.
CPC ............ *B01D 29/31* (2013.01); *B01D 29/94* (2013.01); *E04H 4/1209* (2013.01); *E04H 4/14* (2013.01)

(58) Field of Classification Search
CPC ........ B01D 29/31; B01D 29/94; B01D 29/96; B01D 29/35; E04H 4/1209; E04H 4/14; E04H 4/1272
USPC ................ 210/167.1, 167.19, 232, 238, 448
See application file for complete search history.

(56) References Cited

U.S. PATENT DOCUMENTS

| | | | | |
|---|---|---|---|---|
| 4,325,150 A * | 4/1982 | Buddy | ................. | E04H 4/1272 137/578 |
| 8,721,881 B1 * | 5/2014 | Smith | ..................... | C02F 1/001 210/167.1 |
| 8,864,986 B1 * | 10/2014 | Smith | ................... | E04H 4/1272 210/167.1 |
| 10,772,307 B1 * | 9/2020 | Triplett | ................ | A01K 63/045 |
| 2012/0006730 A1 * | 1/2012 | Tesauro | ................... | E04H 4/14 210/87 |
| 2016/0222687 A1 * | 8/2016 | Smith | ..................... | C02F 1/001 |

* cited by examiner

*Primary Examiner* — Fred Prince

(57) ABSTRACT

A quick release pool skimmer basket apparatus includes an adjustable attachment apparatus, a basket having a sidewall, a filter element coupled to the sidewall to move between an open position and a closed position, and a handle extending upwardly from the basket. A trigger in the handle is operatively coupled to the filter element to hold the filter element in the closed position. Activation of the trigger releases the bottom from the closed position to the open position.

8 Claims, 9 Drawing Sheets

ADJUSTABLE BERNOULLI SKIMMER BASKET

CROSS-REFERENCE TO RELATED APPLICATIONS

For purposes of the USPTO extra-statutory requirements, the present application constitutes a continuation-in-part of U.S. patent application Ser. No. U.S. Ser. No. 14/082,110, entitled QUICK RELEASE POOL SKIMMER BASKET APPARATUS, naming THOMAS V. LOPEZ as inventor, filed Nov. 16, 2013.

FIELD OF THE INVENTION

The present invention relates generally to pool equipment, and more particularly to pool skimmer accessories.

BACKGROUND OF THE INVENTION

Most swimming pools have a pool pump and filter assembly to remove debris, both large and small from the pool and to cleanse and purify the pool water, so that swimmers may enjoy a clean, healthy pool. Pool pump and filter assemblies are essential for maintaining a useable pool, and keeping the pool pump and filter assembly clean, free of foreign debris, and working is important.

In many swimming pools, water is drawn off the top surface of the pool water, and also near the bottom of the pool, into piping that communicates the water to the pool pump and filter assembly. A pump in the pool pump and filter assembly spins an impeller to create pressure which draws the water into the pool pump and filter assembly, and which returns water to the pool after it has been filtered and cleaned. A filter in the pool pump and filter assembly typically removes very fine particulates from the pool water, but there are several pre-filters which remove larger material before it can reach the pool pump and filter assembly. One pre-filter is disposed just upstream of the pump and prevents debris from entering the impeller of the pump.

Another pre-filter, carried in the pool skimmer assembly, is disposed upstream from the pre-filter for the pump. The pool skimmer assembly routes water from either the top surface of the pool water, the bottom of the pool, or both, into the pool pump and filter assembly. The pool skimmer routes water from the surface of the pool water into the pool pump and filter assembly when the pool water is at a high level. When the pool water is at a low level, the pool skimmer routes water from the bottom of the pool into the pool pump and filter assembly. The pool skimmer is typically fit with a basket that collects debris from the water immediately after being drawn from the pool. The basket generally has large openings and collects large items, such as leaves, sticks, twigs, bugs, feathers, and other similar debris. Various designs and developments have been made with pool skimmer baskets, including baskets that lock into the pool skimmer, baskets with handles, baskets that minimize clogging, and baskets that minimize the destructive effects of cavitation. With all of these designs, the basket eventually fills with debris, becomes clogged, and has to be emptied for the pool pump and filter assembly to operate properly. Unfortunately, most pool skimmer baskets are very difficult to clean, and debris can become stuck in the basket, requiring that the basket be shaken violently, beat against a hard object, or that the pool operator actually use his hand to dig out water-logged debris. The inventor has realized that an improved pool skimmer basket is needed.

SUMMARY OF THE INVENTION

According to the principle of the invention, a pool skimmer basket apparatus includes a basket having a sidewall and bottom pivotally mounted to the sidewall to move between an open position and a closed position. A handle extends upwardly from the basket to above the basket and carries a trigger which is operatively coupled to the bottom. Activation of the trigger releases the bottom from the closed position to the open position. In operation, the basket apparatus is applied to a pool skimmer assembly and collects debris drawn off the surface of the pool water. When the basket apparatus becomes full of debris, the basket apparatus is gripped by the handle, removed from the pool skimmer, and taken over a trash can. The trigger is activated, and the bottom is released, allowing the collected debris to fall out of the basket apparatus.

BRIEF DESCRIPTION OF THE DRAWINGS

Referring to the drawings.

DETAILED DESCRIPTION

Figure 1:
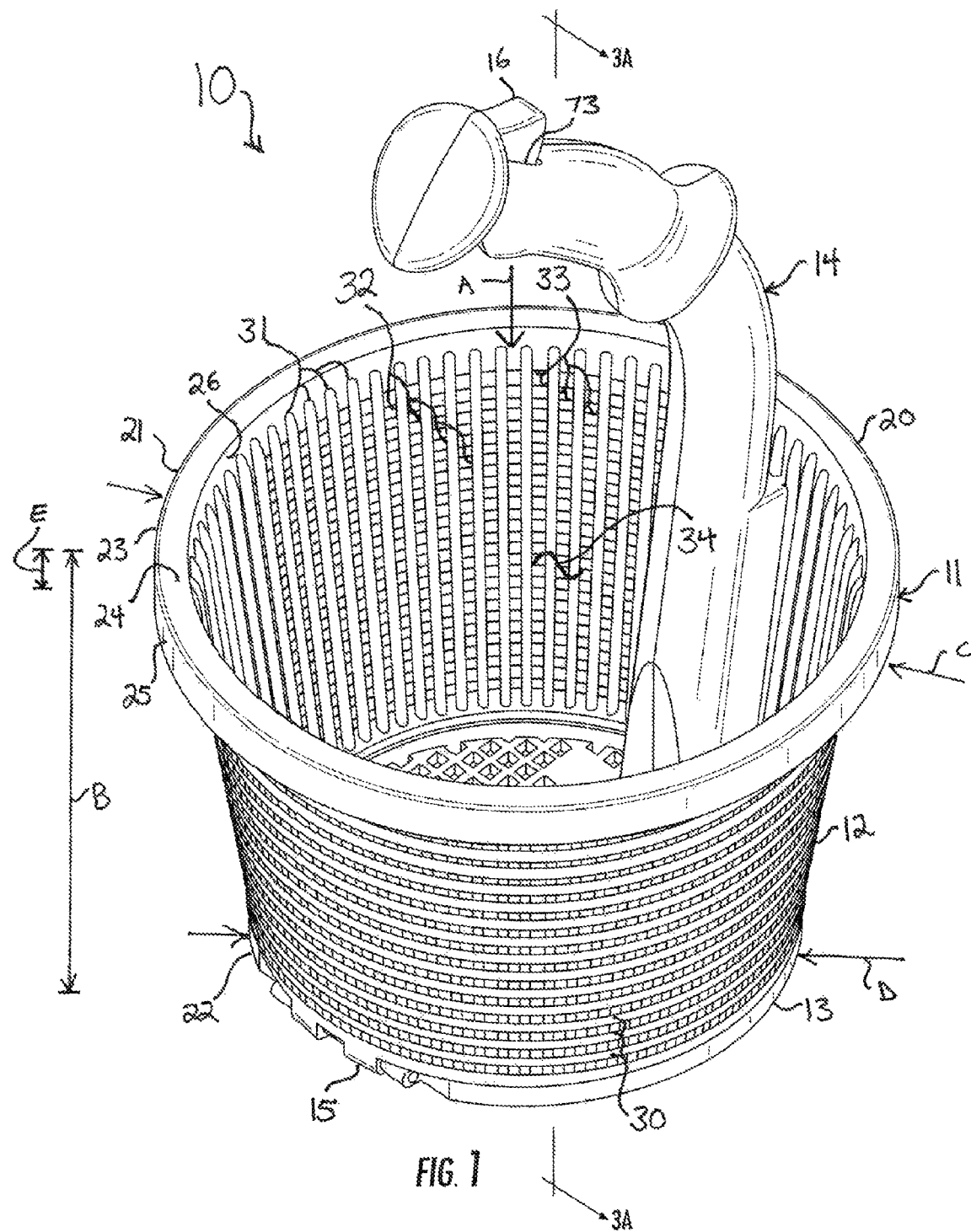
FIG. 1 is a top perspective view of a basket apparatus constructed and arranged in accordance with the principle of the invention, illustrating a basket with a sidewall and a bottom, and a handle extending from the basket.

Reference now is made to the drawings, in which the same reference characters are used throughout the different figures to designate the same elements.

FIG. 1 illustrates a quick release pool skimmer basket apparatus 10 ("basket apparatus 10") constructed and arranged in accordance with the principle of the invention for application and use with a pool skimmer assembly to collect debris before it enters the pool pump and filter assembly. The basket apparatus 10 includes a basket 11 having a sidewall 12 and a bottom 13, and an elongate handle 14 coupled to the basket 11 and extending above the basket 11 so as to be easily grabbed and gripped by hand. The bottom 13 is coupled to the sidewall 12 at a hinge 15 formed between the bottom 13 and the sidewall 12, and the bottom 13 pivots from a closed position to an open position in response to depression of a trigger 16 carried in the handle 14. The basket apparatus 10 is normally applied into a pool skimmer assembly and positioned in a flow of water from the pool to the pool pump and filter, and as water is drawn into the pool skimmer assembly, debris carried in the flow of water is trapped by the basket apparatus 10. When the basket apparatus 10 fills with debris, or when it is desired to clean the debris from the basket apparatus 10, a user grabs the handle 14, removes the basket apparatus 10 from the pool skimmer assembly, and depresses the trigger 16, thereby releasing the bottom 13 into the open position thereof and allowing debris collected in the basket 11 to fall out.

The basket 11 a fluid-pervious receptacle for collecting debris from a flow of water entering the pool pump and filter assembly. The sidewall 12 and bottom 13 cooperate together to filter debris from the water and allow an operator to later remove and deposit the debris elsewhere. The sidewall 12 is formed integrally to a frame 20 of the basket 11. In shape, the frame 20 is generally concave, having an inverted, truncated conical form. The frame 20 has an upstream end 21 and an opposed downstream end 22, and the sidewall 12 extends between the upstream and downstream ends 21 and 22. In operation, the upstream end 21 is positioned at an upstream, or intake, end of the pool skimmer assembly, and the downstream end 22 is positioned downstream from the upstream end 21, so that the flow of water moves through the basket 11 generally along the line indicated in FIG. 1 with the reference character A, representing a flow of water A. The frame 20 has a height B, and a tapered diameter, which includes an upstream diameter C and a downstream diameter D. The upstream diameter C is slightly larger than the downstream diameter D.

Throughout this description, the terms upstream and downstream will be used contextually to describe relative locations. When "upstream" is used to describe the position of an element, the term means that the element is located in a direction from the downstream end 22 to the upstream end 21, and when "downstream" is used to describe the position of an element, the term is means that the element is located in the direction from the upstream end 21 to the downstream end 22. In context, the term "above" may be supplanted for "upstream," and the term "below" may replace "downstream." as each of the figures adopts a vertical view in which the basket apparatus 10 has an upstream end 21—up and downstream end 22—down orientation.

The upstream end 21 of the frame 20 is formed with a rigid, overhanging lip 23 which has a solid, continuous, and annular upper surface 24, a solid, continuous, and annular outer surface 25, and a solid, continuous, and annular inner surface 26 opposed to the outer surface 25. The outer and inner surfaces 25 and 26 each extend away from the upstream end 21 a distance E toward the downstream end 22. Distance E is also considered the height of the lip 23. The sidewall 12 extends downstream from the inner surface 26 of the lip 23. The lip 23 provides rigidity to the frame 20, especially when the flow of water A moves quickly. The lip 23 is an interface with the pool skimmer assembly and supports the frame 20 in the pool skimmer assembly.

Typically, when the basket apparatus 10 is applied to a pool skimmer assembly, the bottom 13 will rest against a bottom of the pool skimmer assembly, and the outer surface 25 of the lip 23 will rest in direct contact with and along an inner surface of the pool skimmer assembly, so that the sidewall 12 is set just off from the inner surface of the pool skimmer assembly.

The sidewall 12 is constructed from a plurality of spaced-apart concentric rings 30 and spaced-apart vertical or longitudinal ribs 31. Each ring 30 overlies each rib 31, and conversely, each rib 31 overlies each ring 30, and where the rings 30 and ribs 31 overlie each other, each ring 30 is fused, adhered, welded, or preferably, integrally formed to the rib 31 in the molding process. In this way, the rings 30 and ribs 31 characterize the sidewall 12 as a strong, rigid mesh of overlaps 32 and holes 33 spacing the overlaps 32 apart. Each of the holes 33 is in communication with an interior 34 of the basket 11 and a space outside of the sidewall 12, so that water may flow along the line A into the interior 34 of the basket 11 and then out of the basket 11 through the holes 33 in the sidewall 12. When the basket apparatus 10 is applied to a pool skimmer assembly, water flowing out of the holes 33 in the sidewall 12 will then flow downstream between the inner surface of the pool skimmer assembly and the sidewall 12 and into piping from the pool skimmer assembly to the pool pump and filter assembly, said water flowing through the holes 33 of the sidewall 12 having been filtered of debris by the sidewall 12.

Figure 1A:
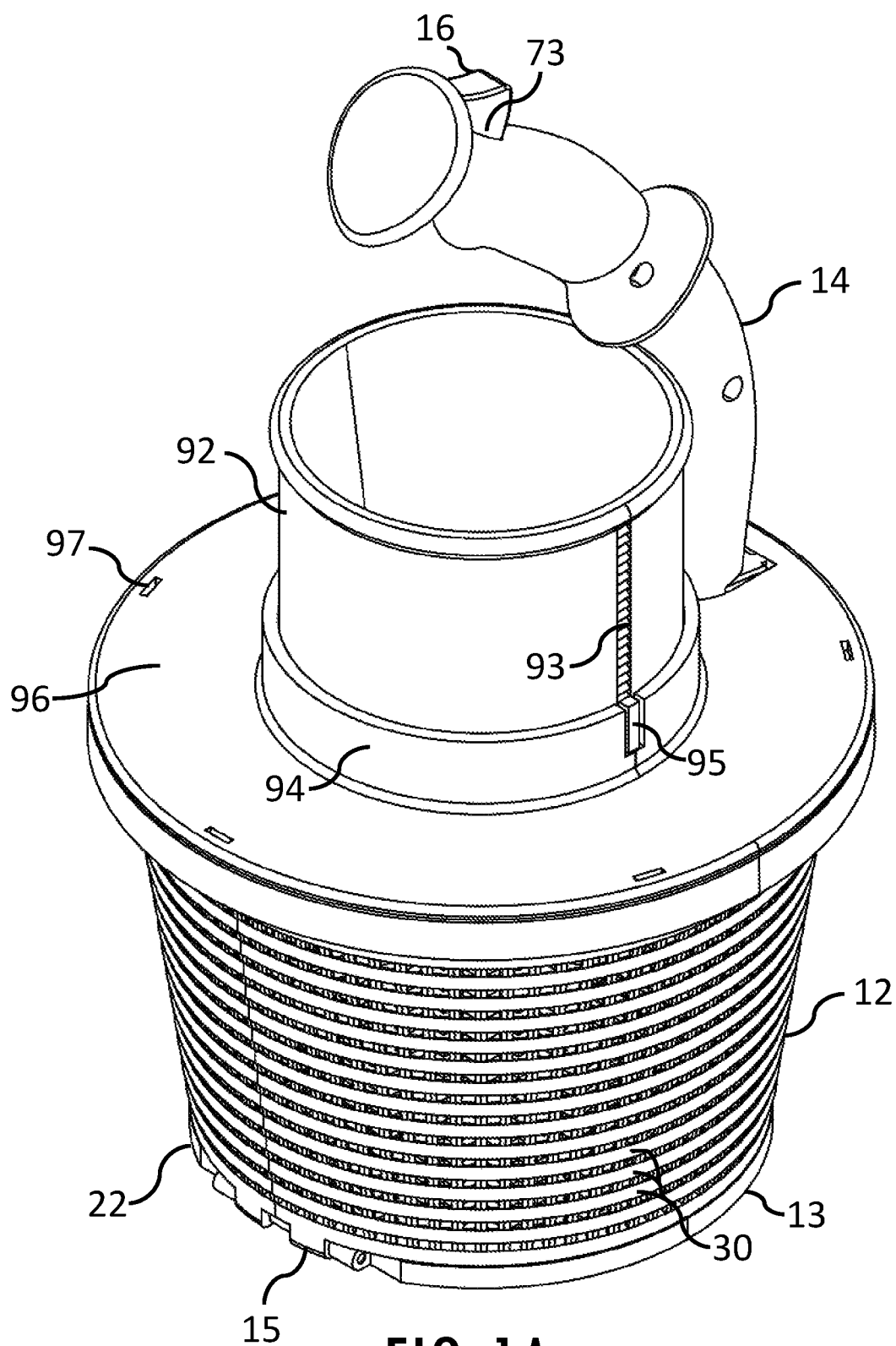
FIG. 1A is a top perspective view of a basket apparatus of FIG. 1 attached to tapered adjustable attachment apparatus attached to the top opening.
Figure 1B:
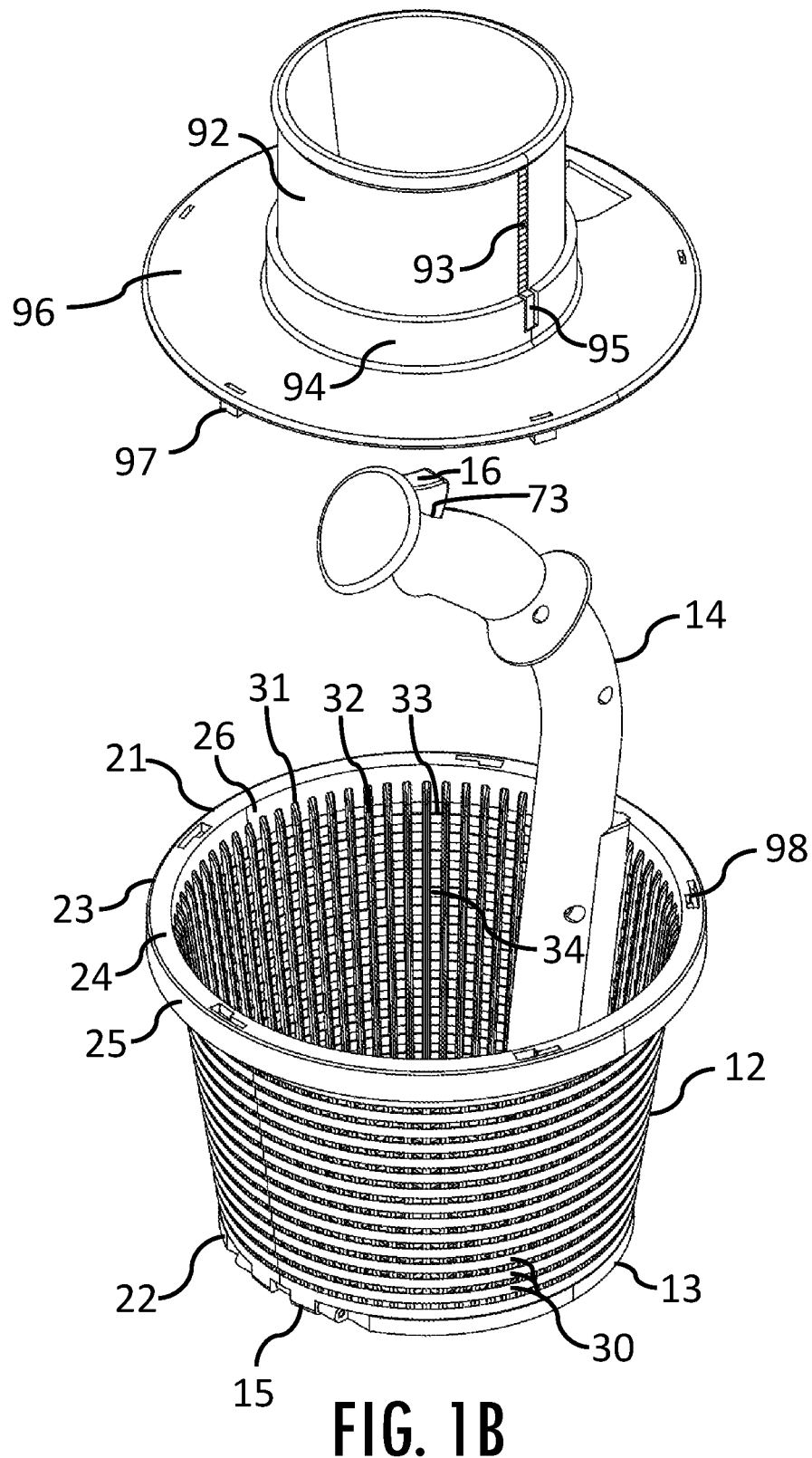
FIG. 1B is a top perspective view of a basket apparatus of FIG. 1 and tapered adjustable attachment apparatus visualised in a detached manner.

FIG. 1A illustrates basket apparatus 10 together with the tapered adjustable attachment apparatus attached to the top opening of the basket apparatus. The tapered adjustable attachment apparatus includes a first upper tube portion 92, the first upper tube portion 92 further includes an wide upper opening 101 and narrowed lower opening 100, the upper 101 and lower openings 100 of the first upper tube portion 92 enables flow of water from upstream to downstream, the first upper tube portion 92 further includes plurality of stepped notch means 93 that enables adjustment of the first upper tube portion 92 from upwards to downwards and downwards to upwards for a desirable pool water height. The tapered adjustable attachment apparatus further includes a second lower tube portion 94, the second lower tube portion 94 has an upper and lower opening, the upper opening comprising adjustment clip means 95 which is parallelly located to the stepped notch means 93 of the first upper tube portion 92 and enables the adjustment of the first upper tube portion 92 from upwards to downwards and downwards to upwards for a desirable pool water height. The lower opening comes with a perpendicularly extended attachment means 96 that further includes a plurality of detachably attachable clip means 97 located at the edges of perpendicularly extended attachment means 96 that enables detachable attachment of tapered adjustable attachment apparatus. Similarly, FIG. 1B provides top perspective visualisation of detached tapered adjustable attachment apparatus and the basket apparatus 10 with clip attachment grooves 98 that enables detachable attachment of detachably attachable clip means 97 located at the edges of perpendicularly extended attachment means 96 of tapered adjustable attachment apparatus.

Figure 2A:
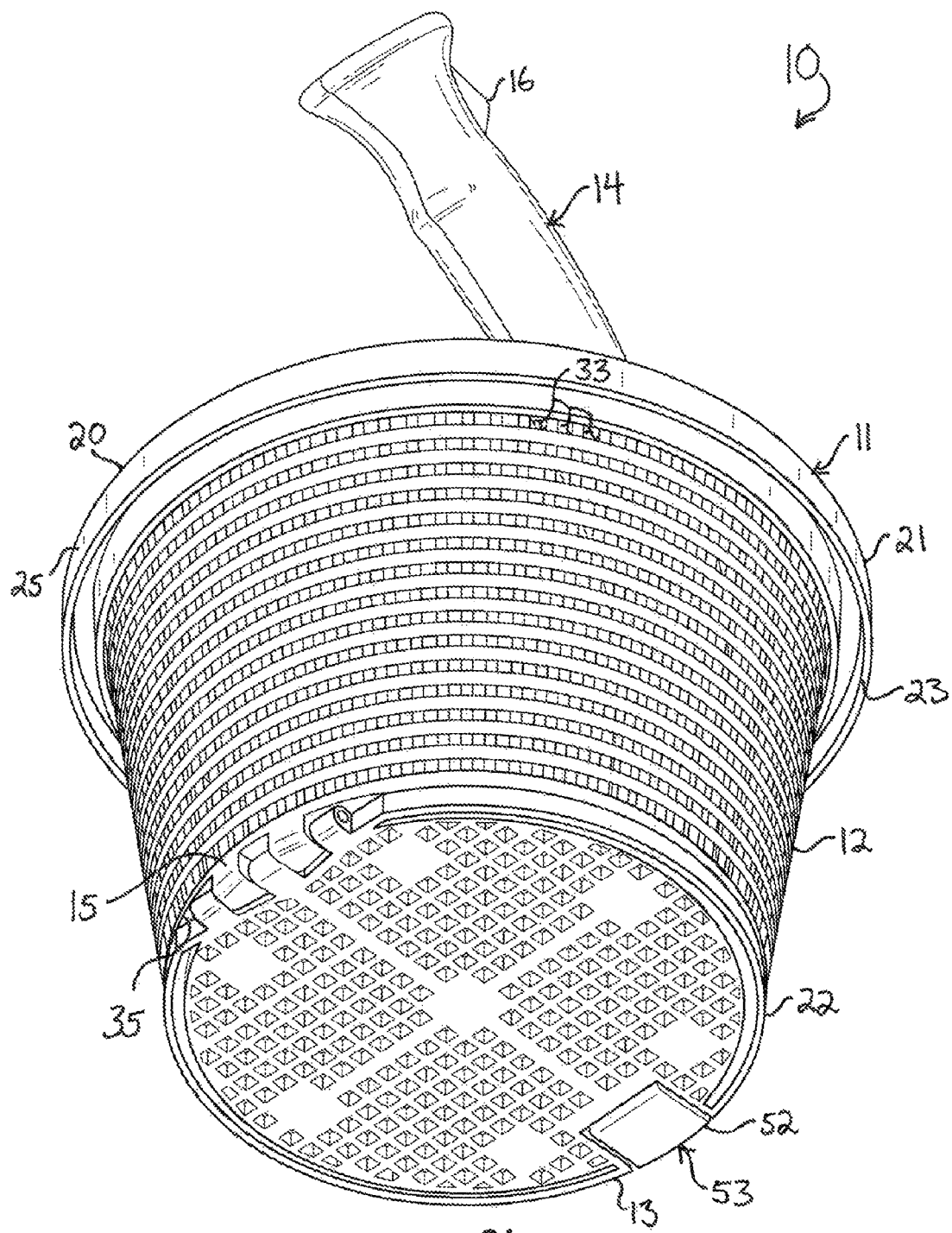
FIG. 2A is a bottom perspective view of the basket apparatus of FIG. 1, showing the bottom in a closed position.
Figure 2B:
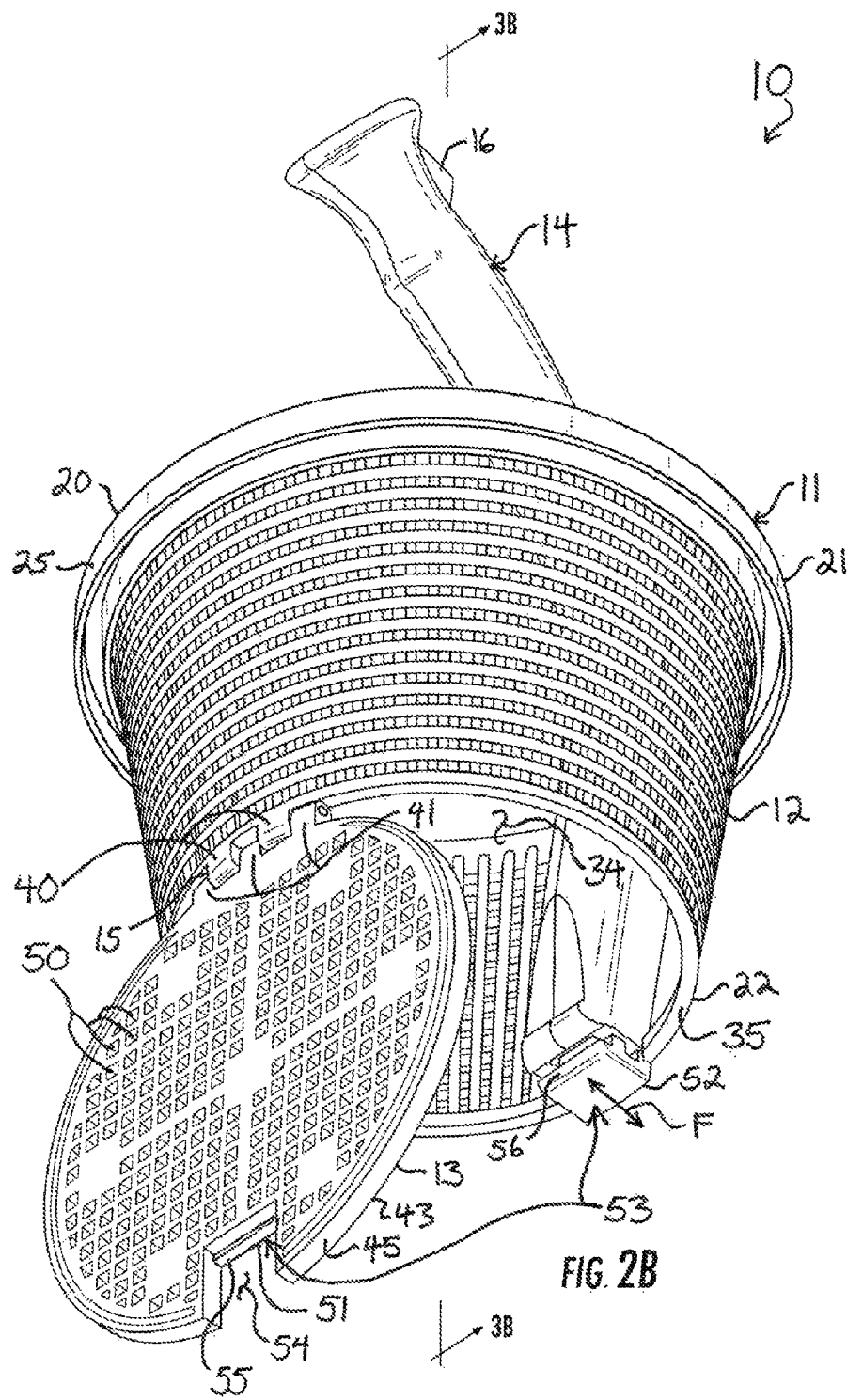
FIG. 2B is a bottom perspective view of the basket apparatus of FIG. 1, showing the bottom in an open position.

The downstream end 22 of the frame 20 can be seen in FIG. 1 as well as in FIGS. 2A and 2B. The downstream end 22 is a solid, annular, rigid ring which has a flat lower surface 35, most clearly seen in FIG. 2B. In other embodiments, the lower surface 35 has a channel formed into the lower surface 35 which receives, in a nesting engagement, an annular tongue formed on the bottom 13 so that the bottom 13 forms a seal against the frame 20. In the embodiment shown in FIG. 2B, the lower surface 35 extends nearly entirely continuously around the downstream end 22 and is disrupted only by the hinge 15. The hinge 15 is carried on both the basket 11 and the bottom 13, with two knuckles 40 projecting integrally from the downstream end 22 of the basket 11 which are enmeshed with three knuckles 41 projecting integrally from the bottom 13. A pin 42 is set through the knuckles 40 and 41, and the knuckles 40 and 41 rotate on the pin 42 to allow the bottom 13 to pivot about the hinge 15.

The bottom 13 of the basket 11 is a flat, monolithic disc or panel pivotally coupled to the downstream end 22 of the basket 11 and corresponding in size to the downstream diameter D of the basket 11. The bottom 13 has an upstream face 43, an opposed downstream face 44, and a circumferential edge 45. The bottom 13 is a filter element and is formed with a plurality of holes 50 extending completely through the bottom 13 from the upstream face 43 to the downstream face 44, allowing the flow of water A to move from the interior 34, through the holes 50, and downstream from the basket apparatus 10, while trapping and collecting debris above the bottom 13. The knuckles 41 project outwardly from the circumferential edge 45 of the bottom 13.

With reference to FIG. 2B, the bottom 13 has a catch 51, which cooperates with a latch 52 to define an engagement assembly 53 for retaining the bottom 13 in the closed position (as shown in FIG. 2A) and releasing the bottom to the open position (as shown in FIG. 2B). The catch 51 is formed in a rectangular inset notch 54 in the bottom 13, and includes a lip 55 proximate to the upstream face 43 and having a thickness less than the distance between the upstream and downstream faces 43 and 44. In other embodiments, the catch 51 is beveled rather than being formed with the lip 55.

While the catch 51 is integral to the bottom 13, the latch 52 is carried on and integral to the basket 11. The latch 52 is a fixture with a projecting lip 56 that engages with the lip 55 on the catch 51 to retain the bottom 13 against the downstream end 22 of the basket 11. The latch 52 moves along the double-arrowed line F in FIG. 2B to engage and disengage with the catch 51. The latch 52 moves forward, toward the interior 34 and toward the hinge 15 to engage with the catch 51, and also moves backward, away from the interior 34 and away from the hinge 15 to disengage with the catch 51. The engagement assembly 53 is diametrically opposed from the hinge 15 on the downstream end 22.

Figure 2C:
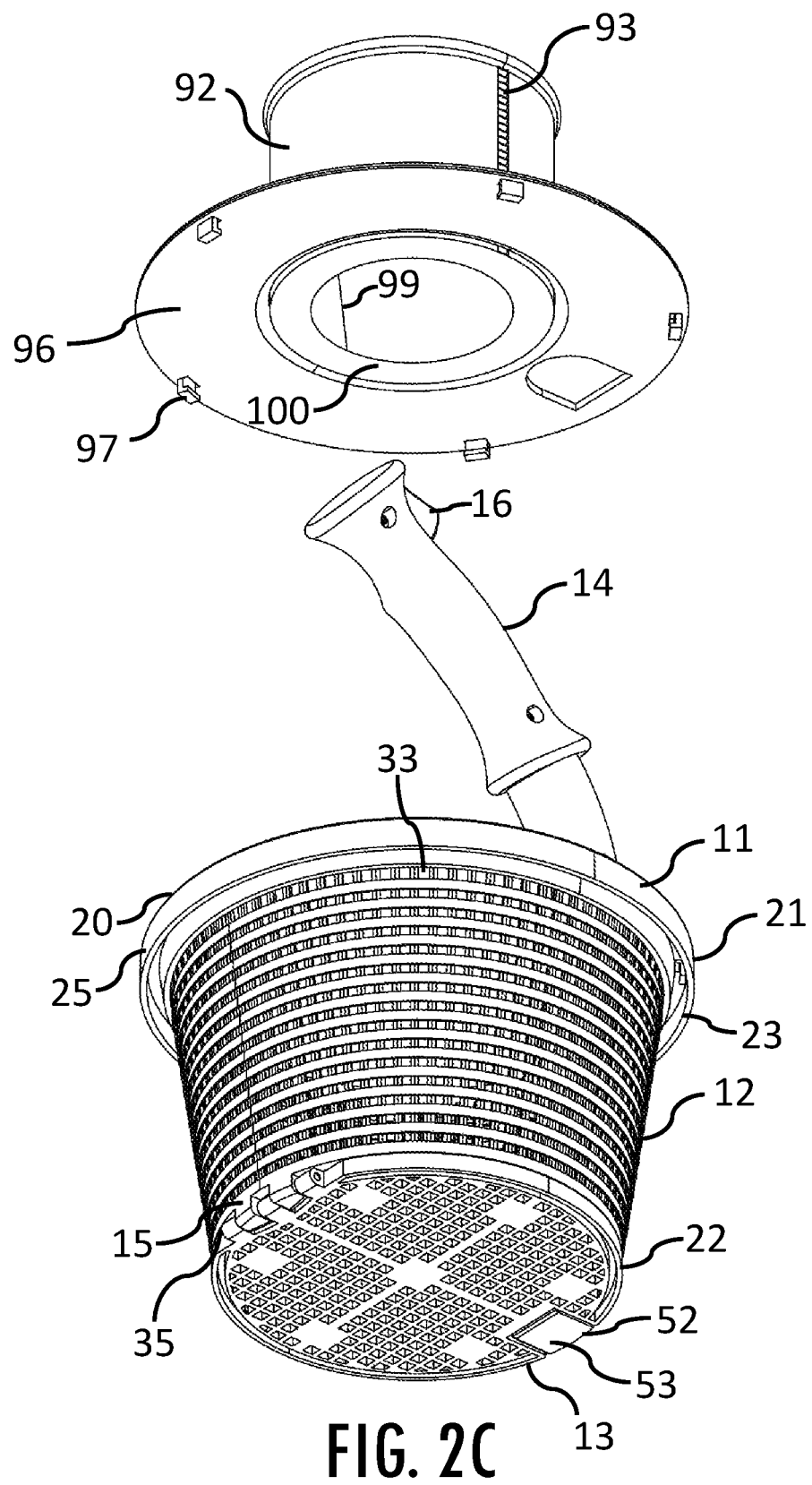
FIG. 2C is a bottom perspective view of the basket apparatus of FIG. 1 and tapered adjustable attachment apparatus visualised in a detached manner.

FIG. 2C provides the bottom perspective visualisation of detached tapered adjustable attachment apparatus and the basket apparatus 10. The FIG. 2C further visualises the narrowed lower opening 100 of upper tube portion 92. The narrowed lower opening 100 of upper tube portion 92 enables increased surface suction and velocity.

Figure 3A:
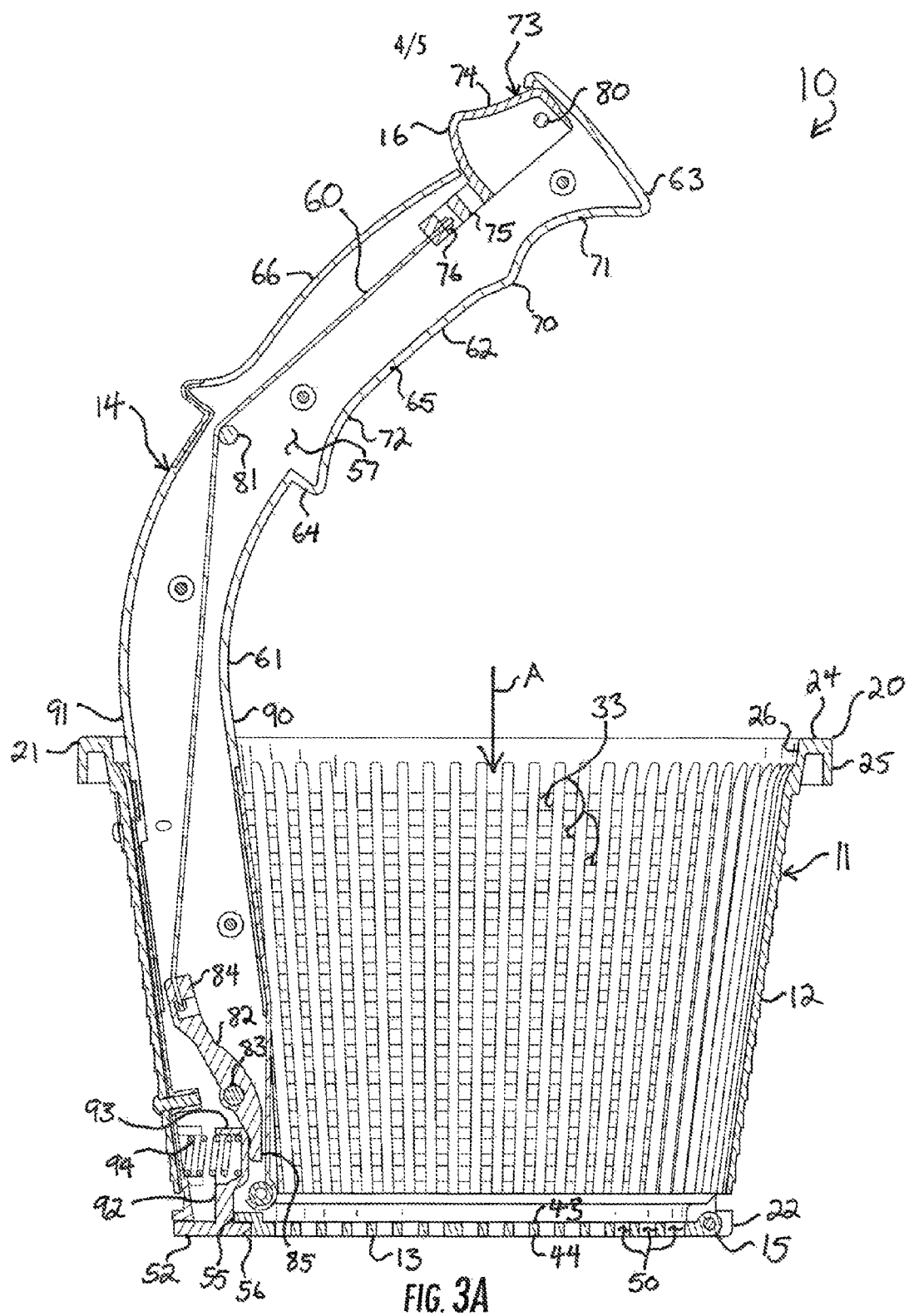
FIG. 3A is a section view of the basket apparatus of FIG. 1 taken along the line 3A-3A in FIG. 1, showing the bottom of the basket in the closed position.
Figure 3B:
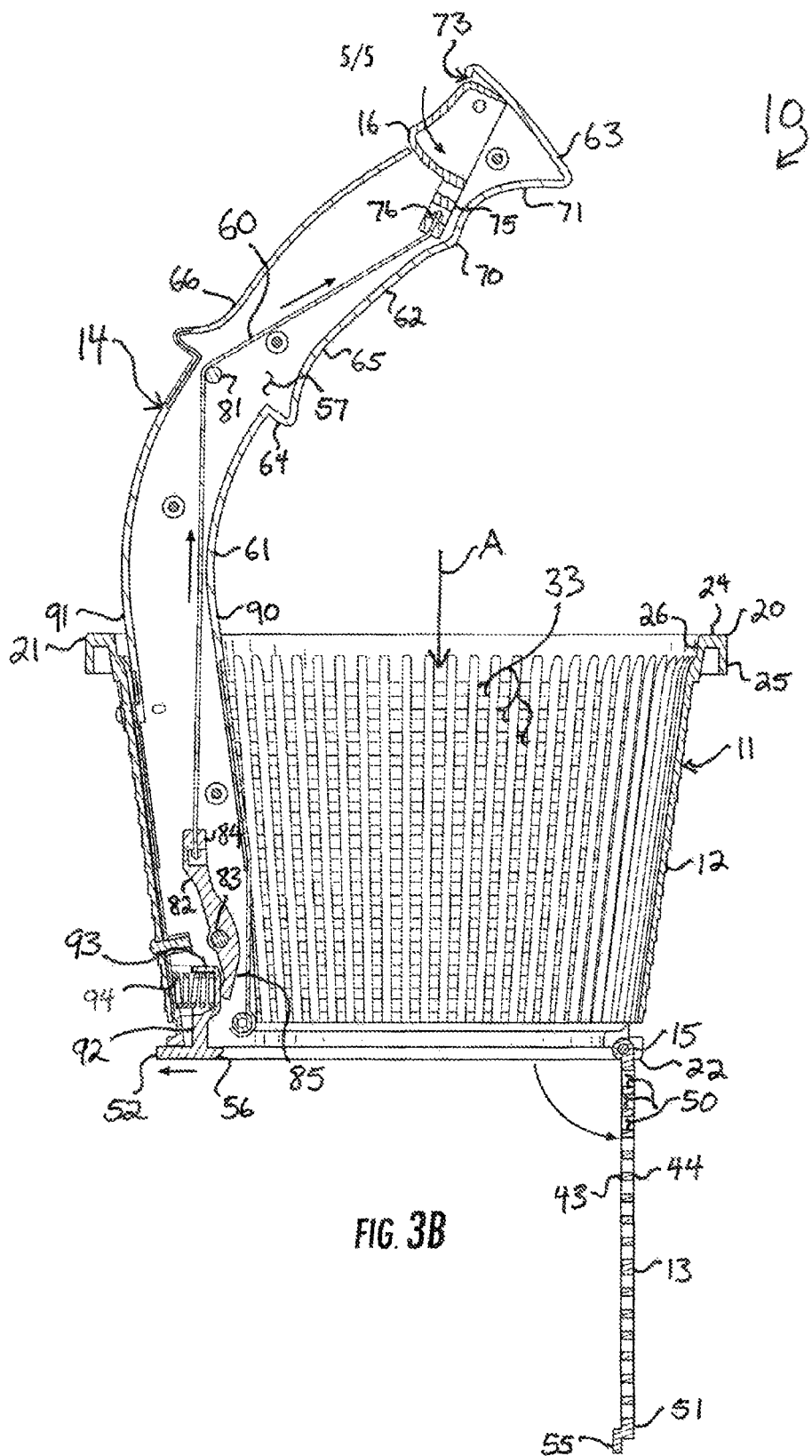
FIG. 3B is a section view of the basket apparatus of FIG. 1 taken along the line 3B-3B in FIG. 2B, showing the bottom of the basket in the open position.

Turning now to FIGS. 3A and 3B, which are section views of the basket apparatus 10 taken along the lines 3A-3A and 3B-3B in FIGS. 1 and 2B, respectively, the latch 52 moves in response to activation of the trigger 16, to which the latch 52 is operatively coupled through a cable 60 extending throughout the handle 14. The handle 14 provides a location for the basket apparatus 10 to be gripped and manipulated, and also houses the structural elements which impart movement to the latch 52 in response to movement or activation of the trigger 16. The handle 14 has two portions: a lower portion, or shaft 61, which is secured to the sidewall 12 of the basket 11, and an upper portion, or grip 62, which is formed to be comfortable when gripped by hand. As seen in FIG. 1, the handle 14 has a solid outer wall along both the shaft 61 and the grip 62, bounding and defining an interior 57 of the handle 14 that is entirely enclosed from and impermeable to water.

Referring to FIG. 3A, the grip 62 has a top 63, an opposed bottom 64, and a front 65 and opposed back 66, the top and bottom 64 and 65 are each flared slightly. A ridge 70 on the front 65 of the grip defines an index finger groove 71 above the ridge 70 and a separate, secondary groove 72 below the ridge 70 for an operator's other fingers. A slot 73 is formed in the back of the grip 62, opposite the index finger groove 71, and the trigger 16 is pivotally coupled within the slot 73 to move into and out of the slot 73.

The trigger 16 is a fixture having a body with a concave face 74. Opposite the face 74, the trigger 16 also includes an elongate leg 75 extending away from the body of the trigger 16, which leg 75 is enclosed within the grip 62 and directed downward toward the shaft 61. The trigger 16 is mounted within the grip 62 on a pivot 80 for pivotal movement about the pivot 80 between a rest position, in which the leg 75 is proximate to the back 66 of the grip 62, as shown in FIG. 3A, and a depressed position, in which the trigger 16 is pivoted forward and the leg 75 is disposed into the ridge 70. The cable 60 is securely attached to the leg 75, so that the cable 60 is pulled or relaxed in response to pivoting of the trigger 16. In FIGS. 3A and 3B, the cable 60 is set into the trigger 16 and is anchored in the leg 75 with a washer 76, but in other embodiments, the cable 60 may be glued, tied, or otherwise secured on the leg 75. From the leg 75, the cable 60 extends down the handle 14 to the bottom 64 of the grip 62, where the cable 60 is routed over a pin 81, which acts as a bearing surface for the cable 60. From the pin 81, the cable 60 extends down to a camming element 82 in the shaft 61, proximate to the downstream end 22 of the basket 11. The cable 60 is taught between the trigger 16 and the camming element 82.

The shaft 61 has a front 90 and back 91, and the camming element 82 is mounted between the front 90 and back 91. The back 91 of the shaft 61 is secured to the sidewall 12 such as with rivets, screws, or other fasteners. The camming element 82 is an elongate body mounted on a pivot 83 within the shaft 61, and the camming element 82 has an upper end 84 above the pivot and a lower end 85 below the pivot 83. When the trigger 16 is in the rest position, the upper end 84 of the camming element 82 is disposed proximate to the back 91 of the shaft 61, and the lower end 85 of the camming element 82 is disposed proximate to the front 90 of the shaft 61, as shown in FIG. 3A. Depressing the trigger 16, as in FIG. 3B, causes the leg 75 to move forward into the ridge 70, retracting, or pulling, the cable 60 upward, and pulling the upper end 84 of the camming element 82 up, causing the camming element 82 to rotate about the pivot 83 and move both the upper and lower ends 84 and 85 to generally intermediate locations between the front and back 90 and 91 of the shaft 61. Releasing the trigger 16 causes the trigger 16 and the camming element to return to their respective positions as shown in FIG. 3A.

The lower end 85 of the camming element 82 is in sliding contact with a portion of the latch 52, so that the camming element 82 and latch 52 are coupled to impart movement to each other. As the camming element 82 pivots, the lower end 85 moves in sliding contact against the latch 52, the latch 52 acting as a bearing surface for the lower end 85. While the latch 52 has a lip 56 which engages with the bottom 15 on the exterior of the basket apparatus 10, the latch 52 also includes an upstanding arm 92 within the shaft 61 formed with a socket 93. The arm 92 is a short projection extending above the lip 56 and terminates in the socket 93 which is concave and directed toward the back 91 of the shaft 61. The socket 93 retains a helical spring 94 compressed between the latch 52 and the back 91 of the shaft 61. The spring 94 urges the latch 52 forward into engagement with the catch 51 on the bottom 15, and also urges the lower end 85 toward the front 90 of the shaft 61, biasing the trigger 16 into the rest position thereof. When the trigger 16 is depressed, it is depressed with sufficient force to overcome the forward force of the spring 94 and cause the lower end 85 to move in sliding contact against the socket 93, move the socket 93 toward the back 91 of the shaft 61, and compress the spring 94, as shown in FIG. 3B. As the socket 93 moves toward the back 91 of the shaft 61, so does the lip 56 of the latch 52, thereby disengaging with the lip 55 of the catch 51 to release the bottom 13. Conversely, when the trigger 16 is released, the spring 94 exerts an outward force against the socket 93 on the latch 52, causing the latch 52 to slide forward and imparting pivotal movement to the camming element 92 about the pivot 83, so that the upper end 84 of the camming element 82 moves toward the back 91 of the shaft 61 and pulls the cable 60 downward, causing the trigger 16 to pivot about the pivot 80 and return to the rest position of the trigger 16.

In operation, the basket apparatus 10 is placed into a pool skimmer assembly, disposed just above the piping from the pool skimmer assembly to the pool pump and filter assembly. When the basket apparatus 10 is in the pool skimmer assembly, the bottom 13 is in the closed position, in direct contact continuously against the lower surface 35 of the basket 11. In this arrangement, the bottom 13 is disposed in an interference position in the flow of water A between the upstream and downstream ends 21 and 22 of the frame 20, and the basket 11 is useful for collecting debris from the flow of water A. FIG. 3A shows the basket 11 and the flow of water A, but the skimmer assembly is not shown for clarity. As debris from the pool, such as leaves, twigs, flowers, bugs, and like items, are drawn into the pool skimmer assembly by the vacuum pressure applied to the pool skimmer assembly by the pump, that debris is drawn into and collected in the basket 11. The debris typically will collect first against the upstream face 43 of the bottom 13, and then, as the debris accumulates, will begin to cover the sidewall 12 as well. As more debris is collected within the basket 11, less water can flow through the basket 11, and eventually the basket apparatus 10 must be cleaned of the debris.

To clean the debris from the basket apparatus 10, a pool operator merely needs to reach into the pool skimmer assembly, as by hand, and grab the basket apparatus 10 by the grip 62 in a thumb-up orientation of the hand, so that the operator's thumb is proximate the top 63 of the grip 62 and the operator's pinky finger is proximate to the bottom 64 of the grip 62. The handle 14 extends above the basket 11 by such a distance that the handle 14 *i* is not submerged under water, so that the pool operator keeps his hand dry. The basket apparatus 10 is then lifted up by the pool operator out of the pool skimmer assembly, and is taken above a trash can or area in which the debris can be deposited. Once the basket apparatus 10 is over the trash can, the operator moves his thumb over the trigger 16 and depresses the trigger 16 inward into the grip 62 to the depressed position of the trigger 16. Depressing the trigger 16 pulls the cable 60 upward within the handle 14, and causes the camming element 82 to pivot, moving the lower end 85 into the latch 52 and imparting translational movement to the latch 52 away from the catch 51. The latch 52 moves away from the bottom 13 and clear of the catch 51, releasing the bottom 13, and the weight of the debris in the basket 11 causes the bottom 13 to fall and pivot away from the basket 11 into the open position thereof, so that the downstream end 22 of the basket 11, and the interior 34 is opened. With the downstream end 22 open, the debris is released from the basket 11. Occasionally, the operator may need to gently shake the basket apparatus 10 once or twice to completely remove the debris, as some debris may become lodged in the holes 50. The operator may release the trigger 16 back to the rest position, and the spring 94 will urge the latch 52 forwardly.

When the basket 11 is cleared of debris, the operator simply raises the bottom 13 from the open position to the closed position. The lip 55 of the catch 51 slides against the lip 56 of the latch 52, and as the bottom 13 is pressed back up into the closed position thereof, the lip 55 of the catch 51 pushes the latch 52 backward slightly and moves past the lip 56 of the latch 52. Once the catch 51 is past the latch 52, the spring 94 urges the latch 52 forward to engage with the catch 51 and retain the bottom 13. With the bottom 13 now securely retained in the closed position, the operator returns the basket apparatus 10 to the pool skimmer assembly, and the basket apparatus 10 will continue to collect more debris.

Figure 3C:
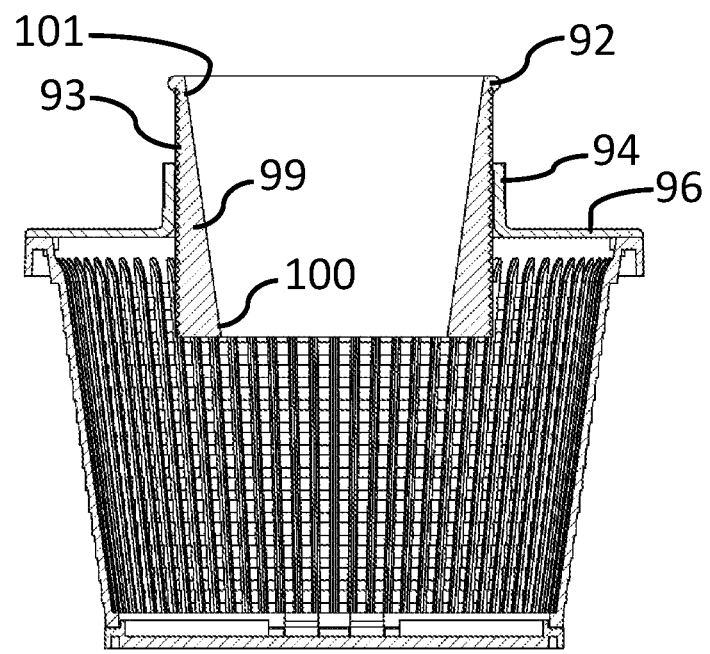
FIG. 3C is a section view of the basket apparatus of FIG. 1 attached to tapered adjustable attachment apparatus with upper tube portion adjusted downwards.
Figure 3D:
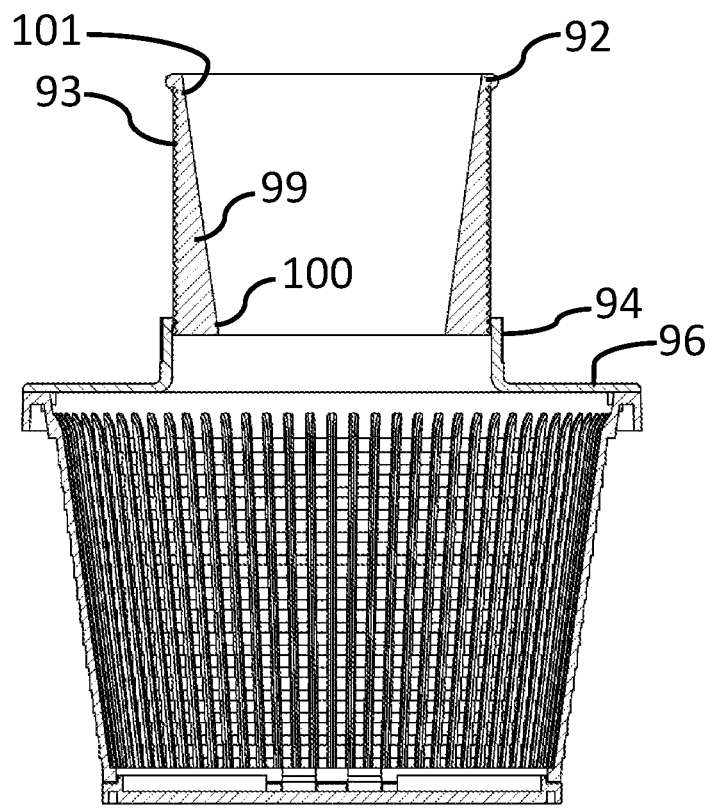
FIG. 3D is a section view of the basket apparatus of FIG. 1 attached to tapered adjustable attachment apparatus with upper tube portion adjusted upwards.

With reference to FIG. 3C, the section view provides basket apparatus 10 together with the tapered adjustable attachment apparatus attached to the top opening of the basket apparatus. The wide upper opening 101, narrowed lower opening 100 and the interior wall 99 of the first upper tube portion 92 of the tapered adjustable attachment apparatus are visible displaying the downward adjustment of the first upper tube portion 92 enabling users to adjust lower water levels in the pool. Similarly, FIG. 3D visualises the upward adjustment of the first upper tube portion 92 enabling users to adjust higher water levels in the pool.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. A pool skimmer basket adjustable attachment apparatus comprising:
   a first upper tube portion, the first upper tube portion comprising a upper opening and a lower opening, the first upper tube portion comprising plurality of stepped notch means vertically located on at least one side of the surface of the first upper tube portion that enables adjustment of the first upper tube portion from upwards to downwards and downwards to upwards for a desirable pool water height; and
   a second lower tube portion, the second lower tube portion comprising an upper and lower opening, the upper opening comprising adjustment clip means which is parallelly located to the stepped notch means of the first upper tube portion and enables the adjustment of the first upper tube portion from upwards to downwards and downwards to upwards for the desirable pool water height, the lower opening comprising a perpendicularly extended attachment means further comprising at least one detachably attachable clip means located at the edges of perpendicularly extended attachment means that enables detachable attachment of adjustable attachment apparatus to the upper surface of a skimmer basket.

2. The adjustable attachment apparatus of claim 1, where in the first upper tube portion is adjustable for multiple water heights and provide different surface suction by adjusting the height.

3. The adjustable attachment apparatus of claim 1, the first upper tube portion is tapered with a wide upper opening and a narrowed lower opening enables flow of water from upstream to downstream with increased surface suction and velocity.

4. The adjustable attachment apparatus of claim 1, wherein an adjustment feature of the first upper tube portion enables users to adjust the attachment apparatus for different surface velocity of pool water.

5. The adjustable attachment apparatus of claim 1, wherein the first upper tube portion is adjustable for at least 1 inch in height enabling users to adjust the attachment apparatus for desirable pool water level.

6. The adjustable attachment apparatus of claim 1, wherein the interior wall of the first upper tube portion can be straight and hollow in shape.

7. The adjustable attachment apparatus of claim 1, wherein the perpendicularly extended attachment means of the second lower tube portion is detachably attached to any kind of skimmer basket available in market.

8. The adjustable attachment apparatus of claim 1 further comprising a pool skimmer basket assemble further comprising:
- a frame having an upstream end and a downstream end, the frame configured for insertion into a flow of water from the upstream end to the downstream end; and
- a filter element coupled between the upstream and downstream ends of the frame to move between a closed position and an open position of the filter element while remaining attached to the frame.

* * * * *